United States Patent
Altherr et al.

(10) Patent No.: US 9,903,240 B2
(45) Date of Patent: Feb. 27, 2018

(54) ADJUSTABLE CAMSHAFT

(71) Applicant: Mahle International GmbH, Stuttgart (DE)

(72) Inventors: Patrick Altherr, Stuttgart (DE); Rolf Kirschner, Esslingen (DE)

(73) Assignee: Mahle International GmbH (DE)

( * ) Notice: Subject to any disclaimer, the term of this patent is extended or adjusted under 35 U.S.C. 154(b) by 101 days.

(21) Appl. No.: 14/959,983

(22) Filed: Dec. 4, 2015

(65) Prior Publication Data

US 2016/0160709 A1    Jun. 9, 2016

(30) Foreign Application Priority Data

Dec. 5, 2014    (DE) .................. 10 2014 225 054

(51) Int. Cl.
*F01L 1/34* (2006.01)
*F01L 13/00* (2006.01)

(52) U.S. Cl.
CPC ......... *F01L 13/0047* (2013.01); *Y02T 10/142* (2013.01)

(58) Field of Classification Search
CPC ............... F01L 13/0047; Y02T 10/142
See application file for complete search history.

(56) References Cited

U.S. PATENT DOCUMENTS

| | | | |
|---|---|---|---|
| 5,417,186 A | 5/1995 | Elrod et al. | |
| 6,021,939 A * | 2/2000 | Shim | B23K 1/19 228/122.1 |
| 9,004,029 B2 | 4/2015 | Watanabe et al. | |
| 2013/0055977 A1 | 3/2013 | Takahashi | |
| 2013/0312681 A1* | 11/2013 | Schultheis | F01L 1/185 123/90.16 |

FOREIGN PATENT DOCUMENTS

| | | |
|---|---|---|
| DE | 3821506 A1 | 12/1989 |
| DE | 4403426 A1 | 8/1994 |
| DE | 10256592 A1 | 6/2004 |
| DE | 102013007071 A1 | 10/2013 |
| EP | 1500797 A1 | 1/2005 |

OTHER PUBLICATIONS

English abstract for EP-1500797.
English abstract for DE-10256592.
English abstract for DE-4403426.
English abstract for DE-3821506.
German Search Report for DE-102014225054.4 dated Sep. 24, 2015.

* cited by examiner

Primary Examiner — Zelalem Eshete
(74) Attorney, Agent, or Firm — Fishman Stewart PLLC

(57) ABSTRACT

An adjustable camshaft of an internal combustion engine may include an outer shaft and an inner shaft arranged coaxially to the outer shaft and rotatable over a predefined angle. At least one first cam may be connected rotationally fixedly to the inner shaft. A second cam may be arranged beside the first cam and may be connected rotationally fixedly to the outer shaft. The first cam and the second cam may each be operatively associated with a common valve. Rotation of the first cam relative to the second cam may impart an extension of a valve opening time of the valve. The first cam and the second cam may each include an identical circular segment section in an elevated region of valve lift. The circular segment section of the first cam and the second cam may merge without interruptions during rotation about the predefined angle range.

20 Claims, 1 Drawing Sheet

ADJUSTABLE CAMSHAFT

CROSS-REFERENCE TO RELATED APPLICATIONS

This application claims priority to German Patent Application No. 10 2014 225 054.4, filed Dec. 5, 2014, the contents of which are hereby incorporated by reference in its entirety.

TECHNICAL FIELD

The present invention relates to an adjustable camshaft of an internal combustion engine, having an outer shaft and an inner shaft, which is arranged coaxially thereto and can be rotated over a certain angle range. The invention also relates to a valve drive system having such a camshaft and to an internal combustion engine having such a valve drive system.

BACKGROUND

DE 10 2010 023 571 A1 discloses a generic adjustable camshaft in the form of a built camshaft for an internal combustion engine, comprising an outer shaft and an inner shaft, which is arranged inside the outer shaft and is mounted such that it can rotate by a predefined angle in relation to said outer shaft, and at least two cams, a first cam being arranged in its entirety for conjoint rotation with the inner shaft and such that it can rotate relative to the outer shaft. The second cam has at least two part-cam elements such that a first part-cam element is arranged in a rotationally fixed manner on the outer shaft and a second part-cam element is connected in a rotationally fixed manner to the inner shaft and is arranged such that it can rotate relative to the outer shaft. This should allow the most variable control possible of the gas exchange valves of the internal combustion engine.

A further camshaft with a variable valve opening period is known from WO 2011/032632 A1.

It is often disadvantageous in the camshafts known from the prior art that they resort to two different cam profiles that make maximum opening of the valve possible. This produces a small peak, which then goes back down to a lower lift. However, this brings a comparatively large dynamic into the associated valve drive system and changes the valve lift during opening. For an Atkinson cycle process, for example, it is advantageous to leave the opening process unchanged and to hold the valve opening over a longer period.

SUMMARY

The present invention is therefore concerned with the problem of specifying an improved or at least an alternative embodiment for an adjustable camshaft of the generic type, which in particular improves the possibilities for use in an internal combustion engine operated according to the Atkinson cycle and is also cost-effective.

This problem is solved according to the invention by the subject matter of independent claim(s). Advantageous embodiments form the subject matter of the dependent claims.

The present invention is based on the general concept of using only cams of a built, adjustable camshaft that have an identical circular segment section in the region of maximum lift to actuate a cam follower, said cams each having a circular segment section and being able to achieve constant opening of an associated valve with the maximum possible lift and at maximum opening speed. The adjustable camshaft according to the invention has, in a known manner, an outer shaft and an inner shaft, which is arranged coaxially thereto and can be rotated over a certain angle range. Furthermore, the camshaft according to the invention has at least one first cam, which is connected in a rotationally fixed manner to the inner shaft, and a second cam, which is arranged adjacently thereto and is connected in a rotationally fixed manner to the outer shaft, which cams each act on the same associated valve, rotation of the first cam relative to the second cam effecting an extension of the valve opening time. According to the invention, it is provided for the first and second cams to have an identical circular segment section in the region of maximum lift. The two cams are furthermore according to the invention arranged in such a manner that even when the inner shaft is rotated to the maximum extent relative to the outer shaft, the circular segment section of the first cam merges without interruptions into the circular segment section of the second cam. In particular, the peak/jump that then goes back down to a lower valve lift, which is present in the camshafts known from the prior art, can be reliably avoided thereby. With the camshaft according to the invention, it is furthermore possible to achieve constant opening of the associated valve with maximum lift at maximum opening speed without the risk of the cam follower lifting off from the cam profile owing to excessively high valve acceleration. Such a camshaft is suitable in particular for an internal combustion engine operated according to the Atkinson cycle, but can also be used for exhaust gas temperature management or for firing order separation.

In an advantageous development of the solution according to the invention, the camshaft can be set in such a manner that a valve controlled therewith has constant opening over a crankshaft angle range of 8° to 25°. The crankshaft angle range in which the associated valve is open can be influenced depending on the size of the circular segment section on the associated cam. The greater the crankshaft angle range that can be covered by the two circular segment sections, the longer the associated valve can be open. The circular segment section also causes the valve to stay in a constant open position when the cam follower slides or rolls on said circular segment section.

In an advantageous development of the solution according to the invention, a valve drive system has at least one above-described camshaft, the first and second cams also having a crowned outer contour. Crowned in this case means barrel-shaped, as a result of which the contact face with the cam follower is reduced. This offers in particular the advantage that no edge loads that lead to excessively high compressive loading occur.

A cam follower or tappet in functional connection with the first and/or second cam expediently has a double-crowned outer contour. This also offers the advantage that no edge loads that lead to excessively high compressive loading occur.

The invention is also based on the general concept of equipping an internal combustion engine with an above-described valve drive system, the internal combustion engine being an Atkinson cycle engine or being operated according to the Atkinson cycle. In this case it is for example conceivable for only a single camshaft to be provided, which actuates both the inlet valves and the outlet valves of the internal combustion engine. Internal combustion engines that operate according to the Atkinson cycle have a different piston stroke for "intake/compression" and "expansion/exhaust" and therefore connect different intake and exhaust volumes. The advantage of internal combustion engines operating according to the Atkinson cycle is that the fuel mixture is further expanded by the extended expansion stroke of the piston and thus a lower exhaust gas temperature and a higher efficiency are achieved. However, the final compression pressure and the maximum combustion pressure and thus the maximum combustion temperature remain the same as in an Otto engine. The reduction of the intake stroke compared to the working stroke results naturally in a reduction in the cylinder charge compared to a normal four-stroke engine. Since the Atkinson cycle engine often has a somewhat reduced power owing to the increased efficiency, for example charging processes or charge air cooling could be initiated.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

BRIEF DESCRIPTION OF THE DRAWINGS

Preferred exemplary embodiments of the invention are shown in the drawings and are explained in more detail in the description below, the same reference symbols referring to the same or similar or functionally equivalent components.

In the figures.

DETAILED DESCRIPTION

Figure 1:
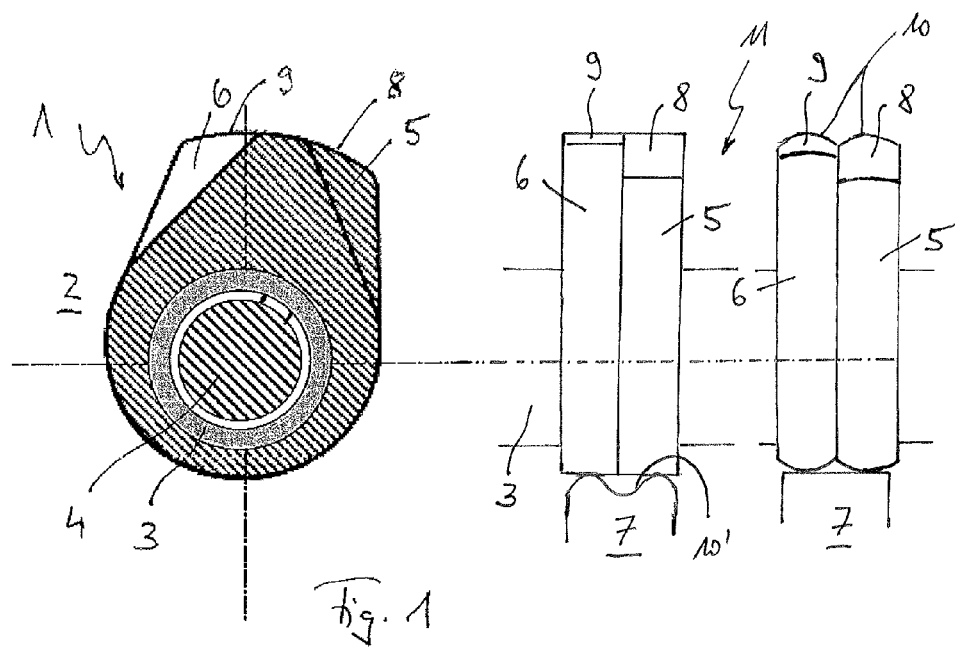
FIG. 1 schematically shows a sectional diagram through a camshaft according to the invention and a side view of the camshaft with different possible cam shapes, FIG. 2 schematically shows a valve lift/time diagram.

According to FIG. 1, a camshaft 1 according to the invention of an internal combustion engine 2 (the rest of which is not shown) has an outer shaft 3 and an inner shaft 4, which is arranged coaxially thereto and can be rotated over a certain angle range. The camshaft 1 according to the invention also has at least one first cam 5, which is connected in a rotationally fixed manner to the inner shaft 4, and a second cam 6, which is arranged adjacently thereto and is connected in a rotationally fixed manner to the outer shaft 3. Both cams 5, 6 act on the same associated valve or on a cam follower 7 that actuates said valve and effect an extension of the valve opening time by rotation of the first cam 5 relative to the second cam 6. According to the invention, the first and second cams 5, 6 have an identical circular segment section 8, 9 in the region of maximum lift. The two cams 5, 6 are arranged in such a manner that even when the inner shaft 4 is rotated to the maximum extent relative to the outer shaft 3, the circular segment section 8 of the first cam 5 merges without interruptions into the circular segment sections 9 of the second cam 6. The desired extended valve opening time can thereby be achieved without producing a jump in the lift of the open inlet or outlet valve, since the two circular segment sections 8, 9 merge flush into each other.

In an advantageous development of the invention, it can also be provided for the first and second cams 5, 6 to be identical. This reduces the number of different parts and thereby saves production, storage and logistics costs.

In an advantageous development of the solution according to the invention, the camshaft 1 can be set in such a manner that a valve controlled therewith is open over a crankshaft angle range between 8° and 25°. Of course, the respective valve opening time can also be influenced by means of the shape and/or length of the circular segment section 8, 9 in the circumferential direction. The greater the angle range covered by the respective circular segment section 8, 9, the longer the associated valve opening time.

If the centre diagram of FIG. 1 is viewed, it can be seen that the cams 5, 6 can have a lateral surface, that is, running face for the cam follower 7, of flat cross section, or else can have a crowned outer contour 10, as is shown in the right-hand diagram of FIG. 1. The diagram is to be understood such that of course if possible only cams 5, 6 having a crowned outer contour 10 or a running face of flat cross section are used to ensure that both cams 5, 6 are identical.

Figure 2:
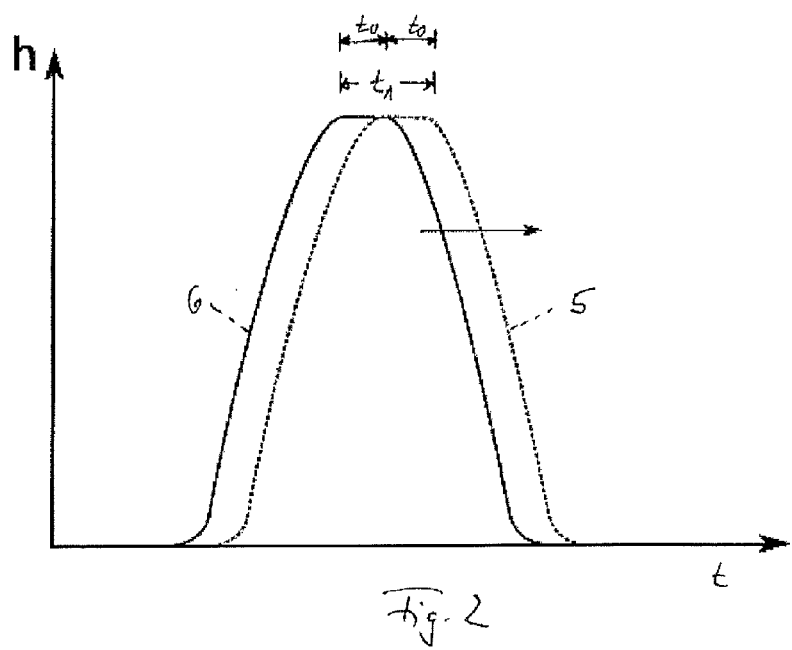

If FIG. 2 is viewed, it can be seen that a time span $t_1$ in which the valve has its maximum lift h can be extended in relation to the opening times $t_0$ of the individual cams 5, 6 by rotation of the inner shaft 4 relative to the outer shaft 3, the lift h during the opening time $t_1$ remaining constant. In particular, a jump in relation to the lift h during the opening time $t_1$, which corresponds to the speed dh/dt of the cam follower 7, can be avoided by means of the circular segment sections 8, 9 formed according to the invention; the two curves shown in FIG. 2 symbolise the opening curves of the first cam 5 and of the second cam 6. The camshaft 1 according to the invention can for example be used in an internal combustion engine 2 operating according to the Atkinson cycle or be part of a valve drive system 11.

The camshaft 1 according to the invention in particular makes possible jump-free, maximum opening of an associated valve owing to the circular segment sections 9 that merge such that they flow over each other.

The invention claimed is:

1. An adjustable camshaft of an internal combustion engine, comprising:
    an outer shaft and an inner shaft arranged coaxially to the outer shaft and rotatable over a predefined angle range;
    a first cam connected rotationally fixedly to the inner shaft, and a second cam arranged adjacently to the first cam and connected rotationally fixedly to the outer shaft, wherein the first cam and the second cam are each operatively associated with a common valve, and wherein rotation of the first cam relative to the second cam imparts an extension of a valve opening time of the valve;
    the first cam and the second cam each having an identical circular segment section in an elevated region of valve lift;
    wherein the first cam and the second cam are arranged in relation to one another such that even when the inner shaft is rotated to a threshold extent of the predefined angle range relative to the outer shaft, the circular segment section of the first cam merges without interruptions into the circular segment section of the second cam; and
    wherein the extension of the valve opening time spans over a crankshaft angle of $8°<\alpha<25°$ and the valve is in a constant open position during the extension of the valve opening time via the circular segment section of the first cam and the second cam.

2. The camshaft according to claim 1, wherein the circular segment section of the first cam and the circular segment section of the second cam have a constant radius in a camshaft angle range of 2° to 12.5°.

3. The camshaft according to claim 1, wherein the first cam and the second cam are identical.

4. A valve drive system of an internal combustion engine, comprising:
a lift valve; and
an adjustable camshaft including:
an outer shaft;
an inner shaft arranged coaxially to the outer shaft and rotatable over a predefined angle range;
a first cam connected rotationally fixedly to the inner shaft;
a second cam arranged beside the first cam and connected rotationally fixedly to the outer shaft, wherein the first cam and the second cam are each operatively associated with the lift valve, and wherein rotation of the first cam relative to the second cam imparts an extension of a valve opening time of the lift valve;
the first cam and the second cam each including a circular segment section in an elevated region of valve lift, wherein at least one of:
the circular segment section of the first cam and the circular segment section of the second cam are identical; and
the first cam and the second cam are arranged in relation to one another so that the circular segment section of the first cam merges uninterrupted with the circular segment section of the second cam when the inner shaft is rotated to a threshold extent of the predefined angle range relative to the outer shaft;
at least one of a cam follower and a tappet operatively connected with the first cam and the second cam, wherein the at least one of the cam follower and the tappet has a double-crowned outer contour contacting a running face of the first cam and the second cam.

5. The valve drive system according to claim 4, wherein at least one of the first cam and the second cam includes a crowned outer contour.

6. The valve drive system according to claim 4, wherein the double-crowned outer contour of the at least one of the cam follower and the tappet defines two barrel-shaped contours separated by a middle recessed region.

7. The valve drive system according to claim 4, wherein the extension of the valve opening time spans over a crankshaft angle of $8°<\alpha<25°$.

8. The valve drive system according to claim 4, wherein the circular segment section of the first cam and the circular segment section of the second cam are structured identically and each have a constant radius in a camshaft angle range of 2° to 12.5°.

9. The valve drive system according to claim 4, wherein the first cam and the second cam are configured identical to one another.

10. The valve drive system according to claim 6, wherein the running face of the first cam and the second cam has a flat cross section for contacting the double-crowned outer contour of the at least one of the cam follower and the tappet.

11. An internal combustion engine comprising: a valve drive system, the valve drive system including:
a lift valve; and
an adjustable camshaft including:
an outer shaft;
an inner shaft arranged coaxially to the outer shaft and rotatable over a predefined angle range;
a first cam connected rotationally fixedly to the inner shaft;
a second cam arranged beside the first cam and connected rotationally fixedly to the outer shaft, wherein the first cam and the second cam are each operatively associated with the lift valve, and wherein rotation of the first cam relative to the second cam imparts an extension of a valve opening time of the lift valve;
the first cam and the second cam each including a circular segment section in an elevated region of valve lift, wherein the circular segment section of the first cam and the circular segment section of the second cam are structured identical;
wherein the first cam and the second cam are arranged in relation to one another so that the circular segment section of the first cam merges uninterrupted with the circular segment section of the second cam when the inner shaft is rotated to a threshold extent of the predefined angle range relative to the outer shaft; and
wherein the extension of the valve opening time of the lift valve spans over a crankshaft angle of $8°<\alpha<25°$.

12. The internal combustion engine according to claim 11, wherein the internal combustion engine is configured as an Atkinson cycle engine and the extension of the valve opening time via the circular segment section of the first cam and the second cam opens the lift valve to facilitate further expansion of gas and a lower gas temperature.

13. The internal combustion engine according to claim 11, wherein at least one of the first cam and the second cam includes a crowned outer contour.

14. The internal combustion engine according to claim 11, wherein the valve drive system further includes at least one of a cam follower and a tappet operatively connected with at least one of the first cam and the second cam.

15. The internal combustion engine according to claim 14, wherein the at least one of the cam follower and the tappet includes a double-crowned outer contour.

16. The internal combustion engine according to claim 15, wherein the first cam and the second cam have an outer running face with a flat cross section for contacting the double-crowned outer contour of the at least one of the cam follower and the tappet.

17. The internal combustion engine according to claim 11, wherein the circular segment section of the first cam and the circular segment section of the second cam have a constant radius in a camshaft angle range of 2° to 12.5°.

18. The internal combustion engine according to claim 11, wherein the first cam and the second cam are configured identical to one another.

19. The internal combustion engine according to claim 12, wherein the lift valve is an exhaust valve and the valve drive system further includes an intake valve;
the adjustable camshaft further including a further first cam and a further second cam each having an identical circular segment section in an elevated region of valve lift; and
wherein the adjustable camshaft actuates both the exhaust valve and the intake valve via the first cam and the second cam acting on the exhaust valve and the further first cam and the further second cam acting on the intake valve.

20. The internal combustion engine according to claim 15, wherein the double-crowned outer contour of the at least one of the cam follower and the tappet defines two barrel-shaped contours separated by a middle recessed region.

* * * * *